F. W. JOHNSON.
CUTTING MACHINE.
APPLICATION FILED FEB. 24, 1913.

1,130,979.

Patented Mar. 9, 1915.
6 SHEETS—SHEET 2.

Inventor
Frank W. Johnson

F. W. JOHNSON.
CUTTING MACHINE.
APPLICATION FILED FEB. 24, 1913.

1,130,979.

Patented Mar. 9, 1915.
6 SHEETS—SHEET 4.

Witnesses:
F. H. Alfred
H. R. Wilkins

Inventor
Frank W. Johnson
by Brown & McClellan Attys

F. W. JOHNSON.
CUTTING MACHINE.
APPLICATION FILED FEB. 24, 1913.

1,130,979.

Patented Mar. 9, 1915.
6 SHEETS—SHEET 5.

Witnesses:

Inventor
Frank W. Johnson

UNITED STATES PATENT OFFICE.

FRANK W. JOHNSON, OF CHICAGO, ILLINOIS, ASSIGNOR OF ONE-FOURTH TO BESTWALL MANUFACTURING COMPANY, OF CHICAGO, ILLINOIS, A CORPORATION OF DELAWARE.

CUTTING-MACHINE.

1,130,979.  Specification of Letters Patent.  Patented Mar. 9, 1915.

Application filed February 24, 1913. Serial No. 750,055.

*To all whom it may concern:*

Be it known that I, FRANK W. JOHNSON, a citizen of the United States, and a resident of Chicago, in the county of Cook and State of Illinois, have invented certain new and useful Improvements in Cutting-Machines; and I do hereby declare that the following is a full, clear, and exact description thereof, reference being had to the accompanying drawings, and to the letters of reference marked thereon, which form a part of this specification.

This invention relates to improvements in cutting machines and consists of the matters hereinafter described and more particularly pointed out in the appended claims.

The invention is designed particularly for use in cutting predetermined lengths from a continuously fed strip, sheet, or web of plastic material such as that used for making walls or wall coverings, but it may be applied for use in cutting other materials requiring like treatment when it is severed.

The machine in the preferred embodiment of the invention comprises generally a reciprocable bed-plate over which the sheet or strip to be cut is fed, and which is actuated to move longitudinally with the sheet during the cutting operation; a clamping or presser-foot which clamps the sheet or strip to the reciprocable bed during the cutting operation; a knife or blade capable of movement in a plane at right angles to the reciprocable bed in a direction both perpendicular to said bed and longitudinally of the knife or transversely of the path of movement of said bed, so as to provide a shearing movement of said knife or blade; operating mechanism for producing the coöperating movements of the bed-plate, presser-bar and knife and completing the severing movement of the knife and the lifting movement of the presser-bar during the movement of the bed-plate with the continuously fed strip; tripping means actuated by the moving strip for automatically starting the operating mechanism which produces the said coöperative movement of the bed-plate, knife and presser-foot, and means for automatically stopping the movement of the said parts when returned to their initial positions after the strip or sheet has been cut.

Referring now to the drawings: Fig. 7ª is a like section taken in a plane indicated by the line 7ª—7ª of Fig. 1.

Referring now to the drawings and to that embodiment of my invention illustrated therein, 15 indicates a table or bed-frame having upright side members 16, 16, with horizontal top bearing surfaces or rails 17, 17. 18 indicates a reciprocable bed-plate which bears upon said rails 17, 17 and is arranged to slide thereon. As shown, said bed-plate has depending flanges 18ª, 18ª, which abut against the outer lateral faces of the rails 17, 17 and plates 19, 19 are secured to the bottoms of said flanges 18 and arranged to engage under the marginal bottom edges of said rails which project outwardly beyond the vertical planes of the side frames for the purpose.

Forward of the bed-plate 18 there is placed a shaft 20 which has bearing in journal boxes 21, 21. Said boxes are attached to brackets 22, 22 that are secured to the forward upright edges of the side frames 16, 16.

23, 23 indicate crank arms fixed to the ends of the shaft 20, and 24, 24 indicate links which operatively connect said crank-arms with the reciprocable bed-plate 18, in such manner that the rotation of the crank-arms will produce a horizontal reciprocation of the bed-plate 18.

At each end of the bed-plate 18 in the plane of the side frame 15 there are fixed two upright spaced guide posts 25, 25. 26 indicates a cross-bar or beam located above and extending longitudinally of the reciprocable bed-plate 18 and rigidly secured to the tops of said guide posts.

27 indicates a knife carrying bar or frame which may be of any familiar construction to give it the required rigidity. It is mounted to slide in the ways provided by the upright guide posts 25 in such manner as to be capable of a vertical reciprocatory movement and also of a longitudinal movement in a direction transverse of the machine frame. 28 indicates a knife or blade carried at the bottom of said bar 27.

29, 29 indicate parallel links pivotally connected at their upper ends to studs on the cross-bar 26 and pivotally connected at their lower ends to studs on the knife carrying bar 27. Said links act to hold the edge of the knife 28 in parallelism with the bed-plate 18, as the knife makes its vertical reciprocatory and longitudinal reciprocatory movement, as will be hereinafter described.

The knife carrying bar or frame 27 has its ends extended beyond the side frames 15, 15 of the machine and the end parts of said knife bar have bearing in vertical slots 31 formed in vertically reciprocable blocks 32. As shown, the blocks 32 each have laterally extending flanges 32$^a$ which are overlapped by and have guiding engagement with vertical flanged strips or bars 25$^a$, 25$^a$ attached to the posts 25, 25, at either side of the knife bar ways.

Near the ends of the knife carrying bar are formed inclined slots 33 which are engaged by transverse pins 34 fixed in the blocks 32. The construction is such that as the blocks 32 are moved downwardly, their connection with the knife carrying bar through the pins 34 will cause a downward pull on the knife carrying bar, while the slots 33 will permit a longitudinal movement to said knife-bar at the same time thus producing a shearing action of the knife or blade carried thereby. The upward movement of the blocks 32 is accompanied by a longitudinal movement of the knife-bar in the opposite direction.

Vertical reciprocation of the blocks 32 is produced by means of upright rods 35, which have pivotal connection at their upper ends with said blocks and at their lower ends are provided each with a fork 36, which embraces and has guiding engagement with a shaft 37 journaled in the side frames below the bed-plate and extending parallel thereto. A cam 38 is fixed on said shaft adjacent each of said forks, said cam having a cam-groove 39 in which a pin or stud 40 carried by the fork has bearing engagement. The cam groove is so shaped that a vertical reciprocation will be produced in the rods 35 in a certain timed relation, to be hereafter more particularly described, thus actuating the knife as heretofore described.

The shaft 37 is connected to the shaft 20 by means of a sprocket-chain 41, each shaft carrying suitable sprocket wheels 42, 43, respectively, for engagement with said chains. The said sprocket wheels are of the same diameter, so that the shaft 20 is driven from the shaft 37 at an equal speed.

Figure 1:
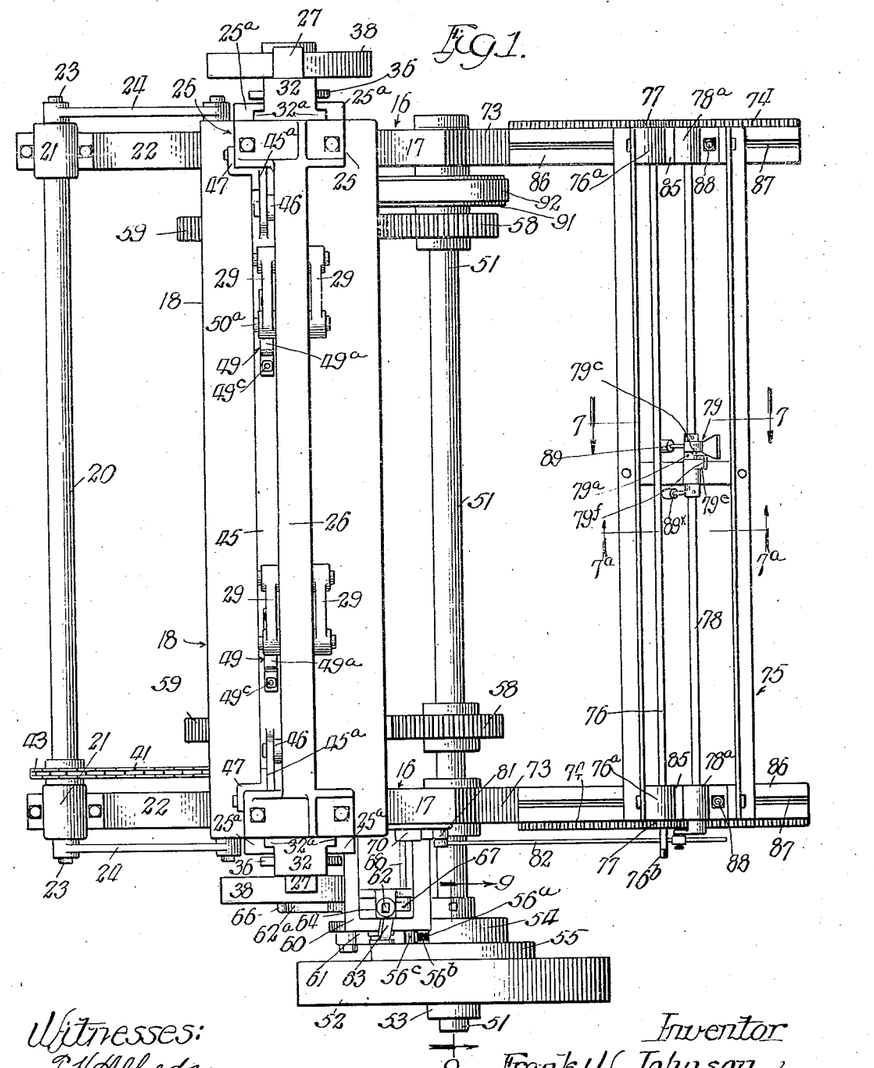
—Figure 1 is a view representing in top plan my improved cutting machine.
Figure 5:
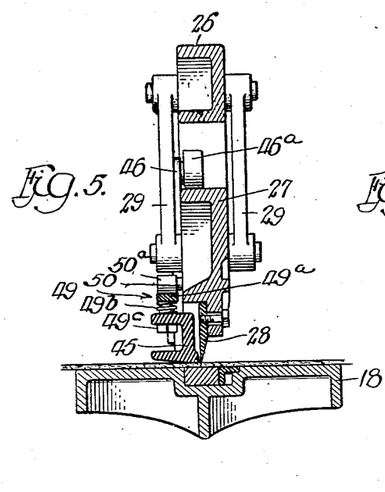
Fig. 5 is a view on an enlarged scale representing a vertical section through the knife supporting bar and reciprocating bed in a plane indicated by the line 5—5 of Fig. 4.
Figure 6:
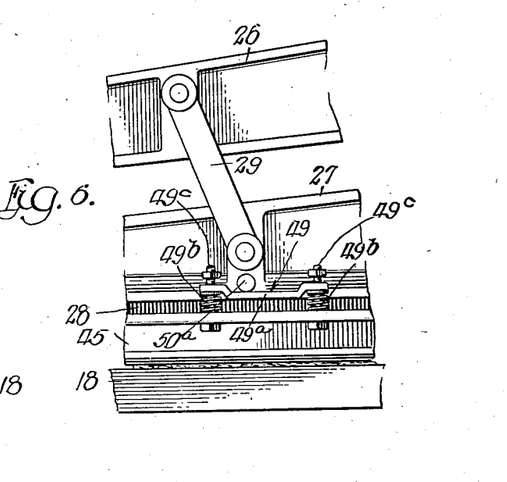
Fig. 6 is a front elevation of the parts shown in Fig. 5 looked at as indicated by the arrows in Fig. 5.

On the forward side of the knife-blade 28 there is provided a presser-bar 45 which extends the length of the knife blade and is located closely adjacent to the knife or blade 28, (see Fig. 5). Said presser bar 45 has vertically extending flanges 45$^a$ at its ends which have guiding engagement with flanged plates 47, 47, that are attached to the forward pair of upright guide posts 25, (see Fig. 1).

46, 46 indicate upright bars attached to the presser-bar near its ends and carrying at their upper ends rollers 46$^a$, 46$^a$, which are adapted for engagement with the top edge of the knife bar 27, so that as the knife bar rises its upper edge, engaging the roller 46$^a$, will lift the presser-bar 45. As the knife bar descends, gravity causes the presser-bar 45 to descend with it, and the bars 46, 46 are made of such length that the presser-bar strikes the bed-plate in advance of the knife.

49, 49 indicate yielding cushion devices which are engaged by studs 50, 50, carried by the knife-bar in its further descent after the presser-bar has come to rest on the bed-plate, in such manner as to apply pressure to the presser-bar. Each cushion device as shown consists of a short-bar 49$^a$, spaced above the presser-bar and of coiled springs 49$^b$, 49$^b$, interposed between the ends of said bar and the top edge of the presser-bar. The bar 49$^a$ is connected to the presser-bar by bolts 49$^c$ about which the springs 49$^b$ are coiled. Each stud 50 is preferably provided with an antifriction roller 50$^a$ which is adapted for engagement with the bar 49ᵃ of the associated cushion member.

Figure 4:
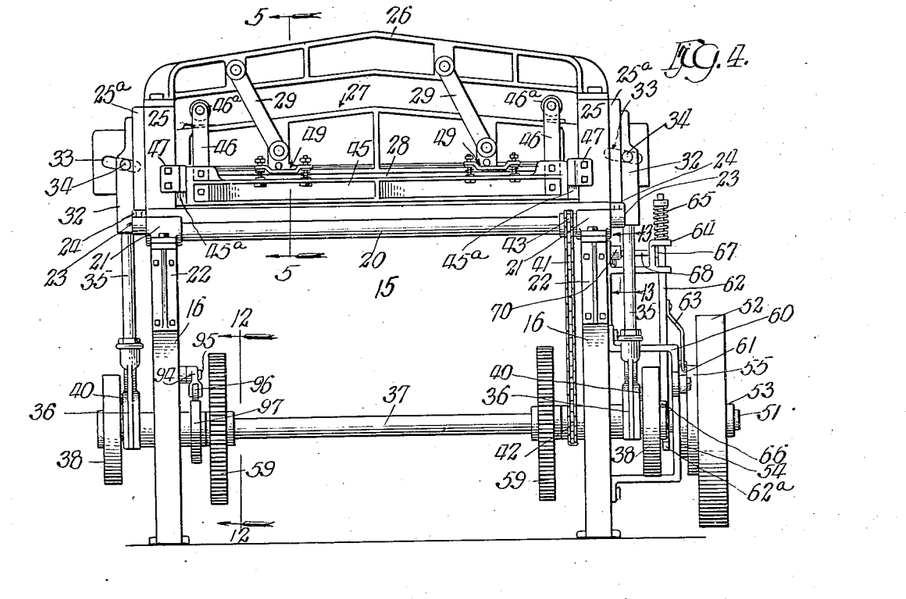
Fig. 4 is a front elevation of a machine, that is to say, an elevation of the machine looked at in a direction from which the paper is being fed.
Figures 9, 10, 11:
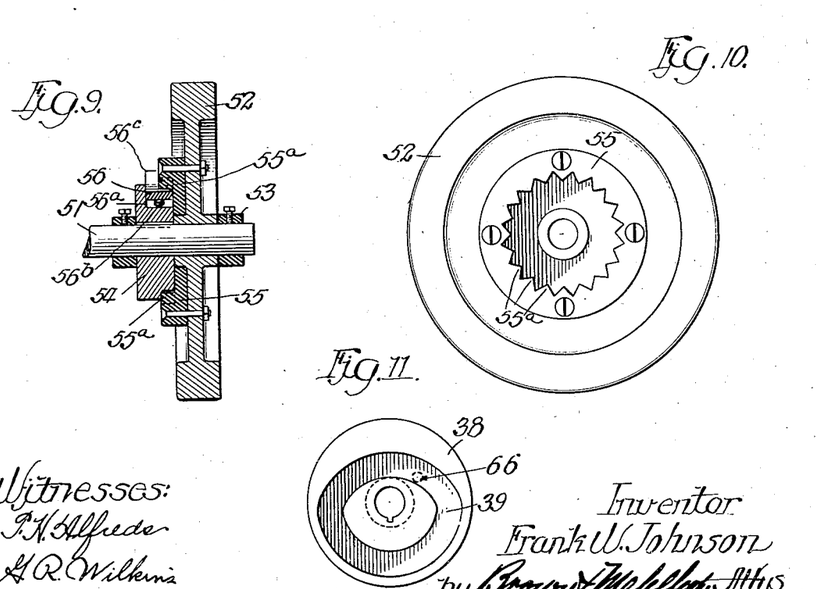
Fig. 9 is a vertical central section through the driving pulley in a plane indicated by the line 9—9 of Fig. 1.
Fig. 10 is a side elevation of the driving pulley.
Fig. 11 is a side elevation of the cam used in the mechanism.

51 indicates a shaft placed to the rear of and extending parallel to the shaft 37. Said shaft is suitably journaled in the side frames 16, 16, and projects at one end beyond the main frame of the machine (the right hand end as viewed in Fig. 4), where it has loosely mounted on it a main driving pulley 52. Said pulley is held in proper position on the said shaft by a fixed collar 53 on one side (see Fig. 9), and by a disk 54 fixed to the shaft on its other side.

55 indicates an internal ratchet-gear fixed to the face of the pulley adjacent to the disk 54 with its teeth 55ᵃ overlapping the periphery of said disk and its central axis coincident with that of the pulley and shaft. 56 indicates a spring controlled dog carried by the disk 54 and adapted for engagement with the internal teeth 55ᵃ of said ratchet-gear. As shown, the disk is provided with a groove 56ᵃ extending in the direction of a chord to its circumference and opening through its face adjacent to the gear. The pawl 56 consists of a bar placed in said groove and capable of swinging movement therein to engage or disengage the teeth of the gear (see Fig. 2), a coiled spring 56ᵇ being interposed between the bar and one edge of the groove to normally hold it engaged with the gear teeth. Said bar is wider than the gear teeth and has a narrow extension 56ᶜ placed adjacent to, but free to pass the outer face of the gear, the purpose of which will presently appear. It is apparent that when the pawl 56 is engaged with the gear, the driving pulley will be locked to the disk 54 and the disk being keyed to the shaft 51, said shaft will be operatively connected with said pulley. Said shaft 51 is operatively connected to the shaft 37 by gears 58, 59, so that the latter shaft will be rotated whenever and only when the shaft 51 is rotated.

On a plate 60 attached to the side frame member 16 adjacent the driving pulley is pivotally mounted an arm 61 which is in the plane of the disk 54 with its end in position to be struck by the extension 56ᶜ of the pawl 56 at a certain point in the rotation of said disk.

Figure 2:
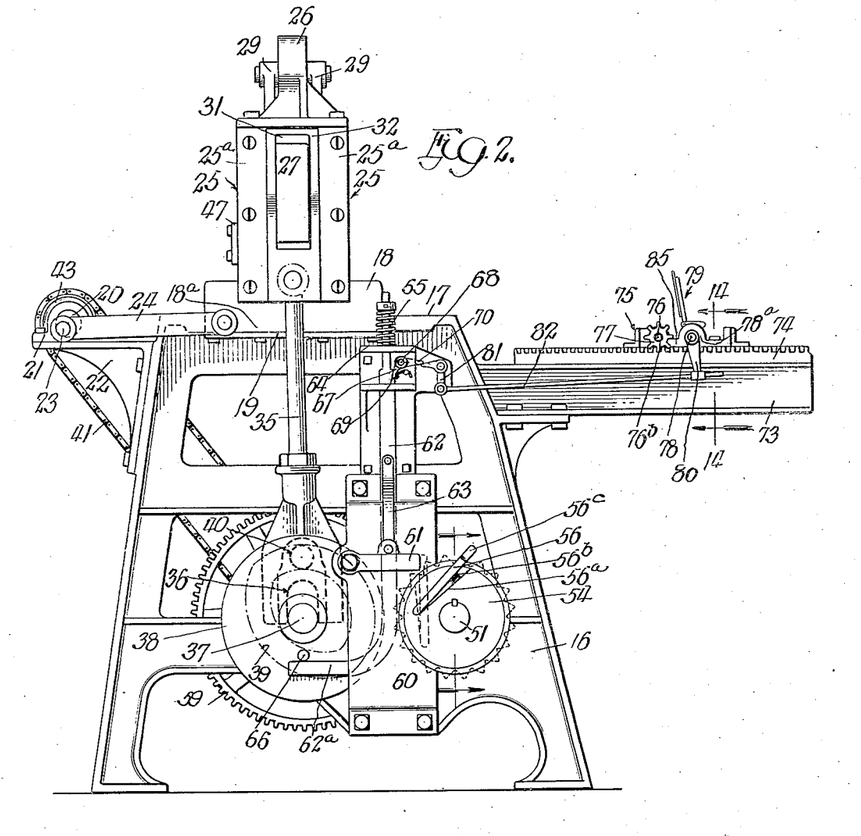
Fig. 2 is a side elevation of the same with the parts approaching their initial position at the time just before the mechanism is tripped.
Figure 3:
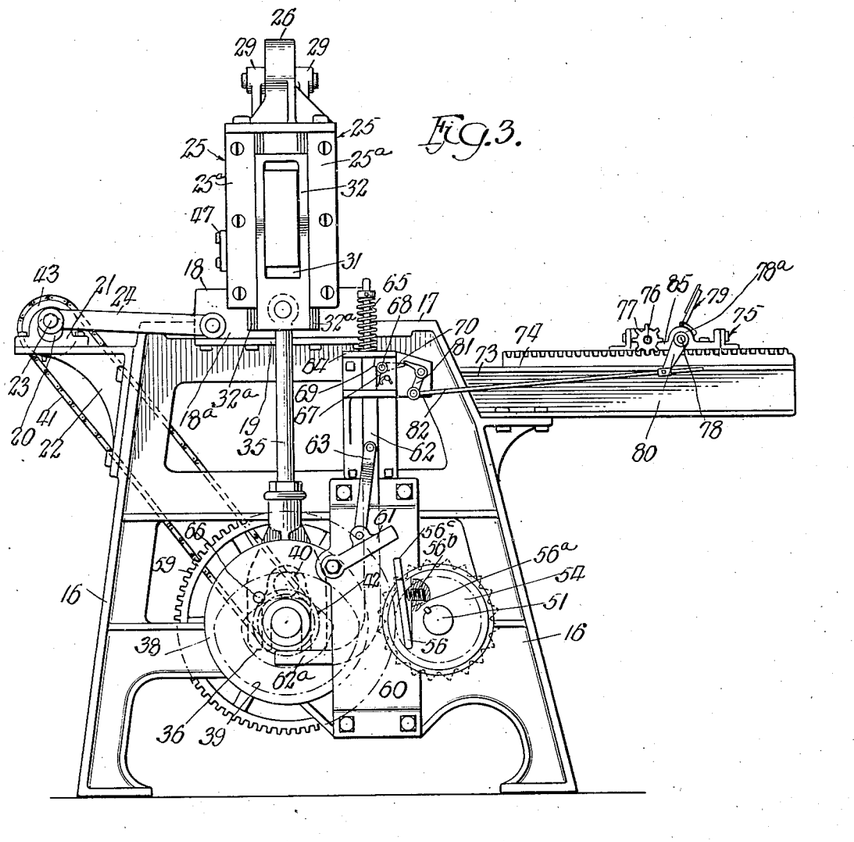
Fig. 3 is a like view showing the parts as they appear with the knife in its lowest position after it is cut through the web or strip of material.
Figure 13:
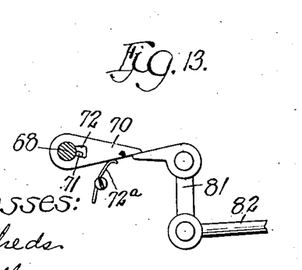
Fig. 13 is a detail sectional elevational view of two of the pawls actuated by the tripping mechanism, said view being taken on a plane indicated by the line 13—13 of Fig. 4.
Figure 14:
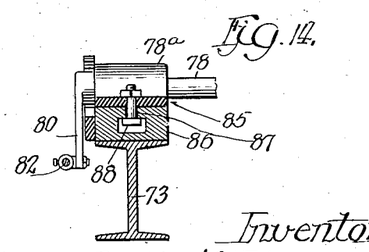
Fig. 14 is a view representing a vertical section on an enlarged scale in the plane indicated by the line 14—14 of Fig. 2.

62 indicates a vertically reciprocable bar suitably supported from the side frame back of the pivoted arm 61 (as viewed in Fig. 2) and having operative connection with said arm through a link 63. A bracket-arm 64 provides a bearing for the bar near its upper end and a coiled expansion spring 65 abutting at one end against the top of said bracket-arm and at the other end against the bottom face of a nut at the top of said bar acts to normally hold said bar in raised position, as shown in Fig. 3. The lower end of the bar 62 has a horizontal offset 62ᵃ which projects into the path of a pin or stud 66 on the cam 38. This pin in one part of the rotation of the cam strikes the said offset extension 62ᵃ of the rod 62 and acts to depress said rod against the upward pull of the spring 65 and bring it into the position shown in Fig. 2. A spring controlled pawl 67, fixed on a short rock-shaft 68, engages a shoulder 69 (see Fig. 2) on the rod 62 when in this depressed position and locks it against upward movement. The rock-shaft 68 has bearing in the bracket arm 64 and in the side frame of the machine. Adjacent the side frame there is mounted on the rock-shaft 68, a rock-arm 70 which is secured to the shaft in such manner that its least movement upward will rock the shaft so as to disengage the pawl 68 from locking engagement with the rod 62 but a limited free movement of the said arm on the rock-shaft is permitted in the opposite direction. As shown (see Fig. 13), a pin 71 on the rock-shaft engages in a radial slot 72 in the arm, said slot being slightly wider than the pin. A weak spring 72ᵃ fixed to the frame normally holds the arm 70 in operative engagement with said pin so that the least upward movement of the arm rocks the shaft.

At the rear of the side frames are mounted horizontal beams 73 carrying horizontal rails 86 to the outer sides of which are attached rack-bars 74.

75 indicates a transversely extending frame or carriage which has sliding bearing on the rails 86.

76 indicates a transversely extending shaft having rotative bearing in journals 76ᵃ, 76ᵃ, fixed on longitudinal bars 85, 85, forming the end members of the carriage 75, and having fixed to its ends, pinions 77, 77 which engage the rack-bars 74, 74. The carriage is anchored to the bars or rails 86, by means of bolts 87, which engage and have sliding bearing in T-slots formed in said bars or rails. By tightening up the bolts the carriage may be locked in any desired position on the rails. The shaft 76 is prolonged at one end beyond the carriage and provided with a squared head 76ᵇ for the attachment of a suitable crank to rotate it.

Figure 7:
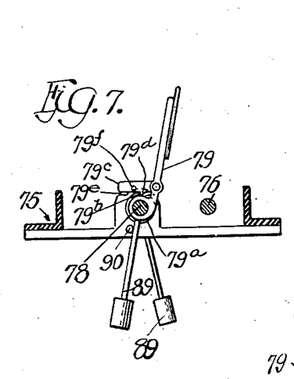
Fig. 7 is a view representing a vertical section through the tripping mechanism in a plane indicated by the line 7—7 of Fig. 1.
Figure 7A:
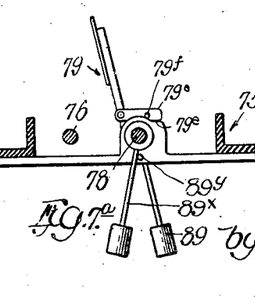
Figure 8:
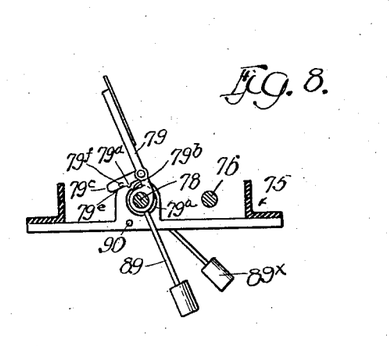
Fig. 8 is a view similar to Fig. 7 showing the parts in a different position.

78 indicates a transversely extending rock-shaft mounted in suitable journals 78ᵃ on the carriage. Near the middle of the rock-shaft there is rotatively mounted a rock-arm 79 which projects up into the horizontal plane of the top of the reciprocable bed-plate, that is to say, into the path of the web or strip that is to be cut. On the rock-shaft adjacent said rock-arm is fixed a collar 79ᵃ (see Figs. 7 and 8) having a notch 79ᵇ. A pawl 79ᶜ is pivoted to the rock-arm 79 having a tooth 79ᵈ adapted for engagement with said notch. A cam 79ᵉ is located adjacent the vertical plane of said pawl to lift it at a certain point in the movement of the rock-arm 79, by engagement with a laterally extending pin 79$^f$ carried by said rock-arm.

At that end of the shaft which is on the side of the machine frame next the driving pulley is fixed a depending rock-arm 80.

81 indicates a bell-crank lever fulcrumed on the machine frame adjacent the before mentioned short rock-shaft 68, the same having a horizontal arm adapted for engagement with the arm 70 on said rock-shaft and a depending arm which is connected by a link 82 to the arm 80 on the rock-shaft 78.

A weighted depending arm 89 is fixed to rotate with the rock-arm 79 on the shaft 78 and a pin or stop 90 is fixed on the carriage 75 in the path of said weighted arm to limit its movement as the arm 79 is swung forwardly of the machine. A depending weighted rock-arm 89$^x$, is fixed to the shaft 78 and a pin or stop 89$^y$ is fixed on the carriage 75 (see Fig. 7$^a$) in the path of said weighted arm to limit its movement as it is swung rearwardly as will be presently described.

Figure 12:
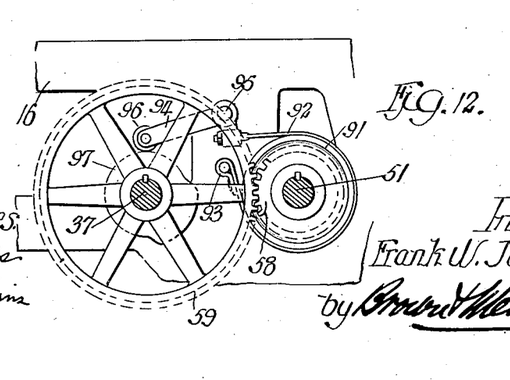
Fig. 12 is the vertical section indicated by the line 12—12 of Fig. 4, the parts being shown on an enlarged scale.

On the shaft 51 is mounted a disk 91 (see Fig. 12) which is frictionally engaged by a flexible band 92. Said band has one end 93 fixed to the machine frame and the other end connected to one arm of a bell-crank lever 94 fulcrumed on a stud 95 fixed to the frame of the machine. The other arm of said lever, (the longer arm as shown,) carries a roller 96 which engages a cam 97 on the shaft 37. Said cam at a certain point in its rotation is adapted to swing the bell-crank lever 94 in such manner as to frictionally engage the band 92 with the disk 91 and brake the shaft 51 so as to retard its speed of rotation. As will presently appear, this point in the movement of the cam is reached when the driving pulley approaches the position at which it is disconnected from the shaft 51 and the operation is to reduce the speed of rotation of the shaft 51 and of the disk 54 and thus diminish the shock of the engagement of the pawl extension 56$^c$ with the end of the arm 61, when the operative connection between the shaft 51 and the driving pulley is broken.

Figure 15:
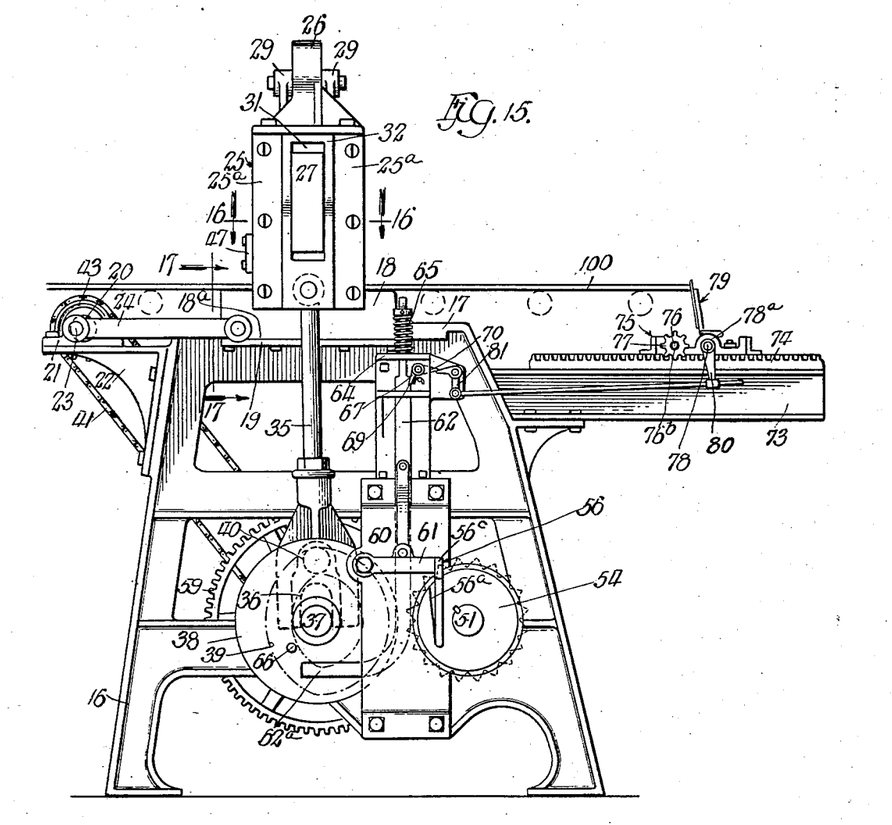
Fig. 15 is a view in side elevation with the several parts in their initial positions.
Figure 16:
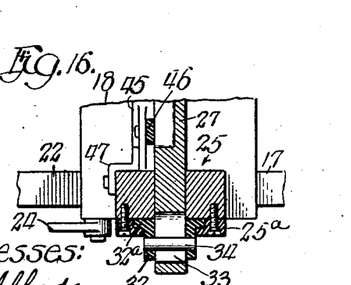
Fig. 16 is a detail sectional view taken on a plane indicated by the line 16—16 of Fig. 15.
Figure 17:
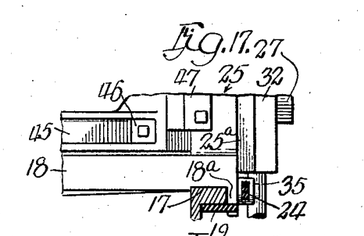
Fig. 17 is a detail sectional view taken on a plane indicated by the line 17—17 of Fig. 15.

The operation of the machine is as follows:—The parts are shown in Fig. 15 with the reciprocable bed-plate 18 at its forward-most position; with the knife-carrying frame 27 and the presser-bar 45 in their uppermost position; with the pins or studs 40 on the vertically reciprocable rods 35 that operate the knife-carrying frame, in a part of the cam-grooves 39 of the cams 38 farthest removed from the axis of rotation of said cams; with the arm 61 engaged against the projecting arm 56$^c$ of the pawl 56, so as to hold it from operative engagement with the internal ratchet gear 55; with the pawl 67 engaged with the shoulder 69 on the vertically reciprocable rod 62 so as to hold the arm 61 in the position above described; with the rock-arm 79 held in its forward position by reason of the engagement of the pawl 79$^d$ of the arm 79$^c$ in the notch 79$^b$ of the fixed collar 79$^a$; with the horizontal arm of the bell-crank lever 81 engaged under the rock-arm 70 on the rock-shaft 61 ready to raise the arm 70 and swing the shaft 68 so as to disconnect the pawl 67 from its shoulder 68 when the rock-shaft 78 is rocked by swinging the rock-arm 79 rearwardly; and with the cam 97 on the shaft 37 in such position that the bell-crank lever 94 is exerting a pull on the brake-band 92 to hold the shaft 51 against rotative movement. With the parts in this position, the web or strip of plastic or other material to be severed is fed continuously over the bed-plate 18, and thus they remain until the severed end of said web or strip 100 strikes the arm 79, as illustrated in Fig. 15. The continued forward movement of the said strip swings the arm 79 rearwardly, or to the right as shown in Fig. 15. This swinging of the rock-arm 79 rocks the shaft 78, by reason of the connection of said arm through the arm 79$^c$ and tooth 79$^d$ with the fixed collar 79$^a$ on the said rock-shaft. The rocking of said shaft as described swings the arm 80 forwardly (or to the left as shown in Fig. 15), causing an upward movement of the horizontal arm of the bell-crank lever 81, so as to raise the arm 70 on the rock-shaft 68 and swing the pawl 67 from its position in engagement with the shoulder 69 on the vertically reciprocable rod 62. Said rod being thus released the spring 65 acts to lift the rod and the lifting movement of the rod 62 acts through the link 63 to raise the arm 61 from its engagement with the extension 56$^c$ on the pawl 56. Meantime the pin 79$^f$ on the arm 79$^c$ is engaged against the cam 79$^e$ so as to lift the pawl 79$^d$ from engagement with the notch 79$^b$ in the collar 79$^a$ fixed on the rock-shaft 78, thus releasing the arm 79 from its connection with the rock-shaft, whereupon the weighted arm 89 swings the rock-arm 79 back into its initial position, the movement of the said parts being limited by the pin 90 which said weighted arm strikes. At the same time the weighted arm 89$^x$ fixed to the shaft 78 acts to return the shaft 78 to its initial position causing the arm 81 to swing back in a rearward direction, its horizontal arm passing the arm 70 on the rock-shaft 68, which, as has been before described, has free play on this shaft to permit this movement; and the rock-arm 80 at the end of the rock-shaft 78 swinging rearwardly to again bring the notch 79$^b$ in the fixed collar 79$^a$ into position where it is engaged by the tooth 79$^d$ on the pivoted arm 79$^c$ carried by the rock-arm 79. This brings the arm 79 and its connected parts into its initial position ready to be again struck by the rearward edge of the next section of the web that is to be cut.

The release of the pawl 56 as above described permits the coiled spring 56b to force it into engagement with the nearest tooth 55a of the internal gear 55, thus locking the disk 54 to the driving pulley 52, so that rotative movement is communicated to the shaft 51. This rotative movement is communicated through the gears 58, 59 to the shaft 37. The cam 97 on said shaft 37 is rotated so as to relieve the pull on the brake-band 91, thus permitting the shaft 51 to rotate freely. The rotation of the shaft 37 being communicated to the cams 38, the pins 40 are forced downwardly by the cam grooves 39, so that the vertically reciprocable rods 35 are caused to descend, thus producing a descending movement of the knife-bar frame 27. With this is combined the longitudinal movement of said knife-bar frame to produce the shearing action on the web already described, as well as the descending movement of the presser-bar 45 to engage and grip the web or strip just prior to and during the time it is being cut. At the same time and in unison with the movement of the knife-bar, rotative movement is communicated through the sprocket-chain 41 to the shaft 20, thus rotating the rock-arms 23 at the ends thereof and imparting to the links 24 a rearward feed movement of the bed-plate 18. The parts thus advance from the position shown in Fig. 15 to the position shown in Fig. 3, in which the bed-plate is shown approaching its rearwardmost position and the knife carrying frame its lowermost position.

It will be understood that the parts are so geared to the driving mechanism that the reciprocating bed-plate moves at the same rate of speed as that at which the web or strip to be cut is fed to the machine. After the knife has descended and severed the web the bed-plate continues to advance during the ascent of the knife carrying frame until said knife carrying frame has reached its highest position and the presser-bar 45 has been lifted by said frame from contact with said web, and then, by reason of the rotative movement of the crank-arms 23 said bed-plate is caused to return toward its initial position, the cam 38 in the meantime turning idly without effecting any movement of the knife carrying frame. In the meantime the pin 66 carried by one of the cams 38 is advancing toward a position to engage the offset arm 62a on the vertically reciprocable rod 62 and finally strikes said offset and depresses the rod 62 so as to bring the arm 61 into the path of the extension 56c on the pawl 56, as indicated in Fig. 2. Then, when in the rotation of the shaft said pawl extension 56c strikes the end of said arms 61, the pawl 56 is forced from its engagement with the internal gear 55, thus releasing the connection between the driving pulley and the shaft 51. Just prior to this the cam disk 97 on the shaft 37 comes to a position to swing the rock-arm 94 so as to frictionally engage the brake-band 92 with the disk 91 on the shaft 51, thereby retarding the movement of the parts and reducing the shock of engagement between the pawl extension 56c and the arm 61. The parts are now again in the position indicated in Fig. 15. The operation thereafter continues as before.

The operating and driving mechanism is so geared with respect to the rate of feed of the strip of material to be cut or severed, that the bed-plate, when moving in the direction of feed of said strip, will move at the same rate of speed. Thus when the presser-bar and knife co-act against the bed-plate to cut said strip, the operation will be the same and will have the same effect as if it were severing a stationary strip against a stationary bed-plate. The result is that there is no danger of the strip that is to be cut buckling although it is cut into predetermined lengths while being continuously fed. This is particularly important in the case of strips of plastic material such as the machine is primarily designed for use with, since any buckling would tend to break or damage the material of which the strip is composed.

While in describing my invention I have referred to certain details of mechanical construction and arrangement, it is to be understood that my invention is in no way to be limited thereto except as may be pointed out in the appended claims.

I claim as my invention:—

1. In a machine for cutting predetermined lengths from a continuously fed strip, a horizontally reciprocable bed-plate, a vertically reciprocable knife co-acting with said bed-plate during the movement of the bed-plate in the direction of feed of said strip, means for actuating said bed-plate and knife in proper timed relation to complete the severing movement of the knife during the movement of the bed-plate in the said direction, said means being intermittent in operation, and a tripping mechanism located at a distance from said knife in the path of said strip and adapted to be actuated thereby for automatically starting said means into operation.

2. In a machine for cutting predetermined lengths from a continuously fed strip, a horizontally reciprocable bed-plate, a vertically reciprocable knife co-acting with said bed-plate during the movement of the bed-plate in the direction of feed of said strip, means for actuating said bed-plate and knife in proper timed relation to complete the severing movement of the knife during the movement of the bed-plate in the said direction, said means being intermittent in operation, a tripping mechanism located at a distance from said knife in the path and adapted to be actuated by said strip, to automatically start said means into operation, the position of said tripping mechanism with reference to said knife being adjustable.

3. In combination, a horizontally reciprocable bed-plate over which a strip to be cut is fed, a vertically reciprocable knife mounted upon and horizontally movable with said bed-plate, said knife co-acting with said bed-plate during the movement of the bed-plate in the direction of movement of said strip, means for actuating said bed-plate and knife in proper timed relation to complete the severing movement of the knife during the movement of the bed-plate in the said direction, said actuating means being intermittent in operation, a trigger mechanism spaced from said knife and adapted to be struck by the severed end of said strip, said trigger mechanism acting to start said actuating means into operation, and means for adjusting the spaced relation between said knife and trigger mechanism.

4. In combination, a horizontally reciprocable bed-plate over which a strip to be cut is fed, a vertically reciprocable knife mounted upon and horizontally movable with said bed-plate, said knife co-acting with said bed-plate during the movement of the bed-plate in one direction, means for actuating said bed-plate and knife in proper timed relation to complete the severing movement of the knife during the movement of the bed-plate in the said direction, a presser-bar actuated in the descent of said knife, a trigger mechanism spaced from said knife and adapted to be struck by the severed end of said strip, said trigger mechanism acting to start said actuating means into operation, and means for automatically stopping the movement of said bed-plate and knife when they have reached their initial positions.

5. In combination, a horizontally reciprocable bed-plate over which a continuously fed strip is adapted to pass, a vertically and longitudinally reciprocable frame mounted on said bed-plate and horizontally movable therewith, a knife carried by said frame, a presser bar actuated in advance of the downward movement of said frame, said knife and presser-bar co-acting with said bed-plate during the movement of the bed-plate in the direction of movement of said strip, and means for actuating said frame, presser-bar and bed-plate in proper timed relation to complete the severing movement of the knife and lifting movement of the presser-bar during the movement of the bed-plate in the said direction.

6. In combination, a horizontally reciprocable bed-plate over which a continuously fed strip is adapted to pass, a vertically and longitudinally reciprocable frame mounted on said bed-plate and horizontally movable therewith, a knife carried by said frame, a presser-bar carried by said frame and capable of independent vertical movement relative thereto, resilient means interposed between said frame and presser-bar, said knife and presser-bar co-acting with said bed-plate during the movement of the bed-plate in the direction of movement of said strip, and means for actuating said frame and bed-plate in proper timed relation to complete the severing movement of the knife and the lifting movement of the presser-bar during the movement of the bed-plate in the said direction.

7. In combination, a horizontally reciprocable bed-plate, a vertically and longitudinally reciprocable frame located beneath said bed-plate, a knife carried by said frame, a presser-bar actuated by said frame, said knife and presser-bar co-acting with said bed-plate during the movement of said bed-plate in one direction, means for intermittently actuating said bed-plate and frame in proper timed relation to complete the severing movement of the knife and lift the presser-bar, a continuously rotating drive member, and automatic means for operatively connecting said actuating means with said driving member.

8. In combination, a horizontally reciprocable bed-plate over which a continuously fed strip is adapted to pass, a vertically reciprocable frame mounted on said bed-plate and horizontally movable therewith, a knife carried by said frame, a presser-bar actuated by said frame, said knife and presser-bar co-acting with said bed-plate during the movement of the bed-plate in the direction of feed of said strip, means for actuating said bed-plate and frame in proper timed relation to complete the severing movement of the knife and lift the presser-bar during the movement of the bed-plate in the said direction, a continuously rotating driving member, means for operatively connecting said driving member with said actuating means and automatic means for throwing out said operative connection when the reciprocatory movement of said bed-plate and frame is completed.

9. In combination, a horizontally reciprocable bed-plate over which a continuously fed strip is adapted to pass, a vertically reciprocable frame mounted on said bed-plate and horizontally movable therewith, a knife carried by said frame, a presser-bar actuated by said frame, said knife and presser-bar co-acting with said bed-plate during the movement of the bed-plate in the direction of feed of said strip, means for actuating said bed-plate and frame in proper timed relation to complete the severing movement of the knife and lift the presser-bar during the movement of the bed-plate in one direction, a continuously rotating driving member, automatic means located in the path of said strip and adapted to be actuated thereby for operatively connecting said driving member with said actuating means when a predetermined length of the strip has been fed over said bed-plate, and automatic means for throwing out said operative connection when the reciprocatory movement of said bed-plate and frame is completed.

10. In combination, a horizontally reciprocable bed-plate over which a continuously fed strip is adapted to pass, a vertically reciprocable frame, a knife carried by said frame, a presser-bar actuated by said frame, said knife and presser-bar co-acting with said bed-plate during the movement of the bed-plate in the direction of feed of said strip, means for actuating said bed-plate and frame in proper timed relation to complete the severing movement of the knife and lift the presser-bar during the movement of the bed-plate in the said direction, a continuously rotating driving member, automatic means for operatively connecting said driving member with said actuating means when a predetermined length of the strip has been fed over said bed-plate, automatic means for throwing out said operative connection when the reciprocatory movement of said bed-plate and frame is completed, and means for simultaneously braking the movement of the parts prior to the time of said disconnection.

11. In combination, a horizontally reciprocable bed-plate over which a strip to be cut is adapted to be continuously fed, a vertically reciprocable knife co-acting with said bed-plate during the movement of the bed-plate in the direction of feed of said strip, means for reciprocating said bed-plate and knife in proper timed relation to complete the severing movement of the knife during the movement of the bed-plate in the said direction, a continuously rotating driving member, an adjustable trigger device located in the path of said strip to be cut, mechanism actuated by said trigger device for automatically coupling said driving member to said bed-plate and knife actuating means, and means for automatically throwing out said coupling means when the reciprocatory movement of said bed-plate and knife has been completed.

12. In combination, a horizontally reciprocable bed-plate over which a strip to be cut is adapted to be continuously fed, a vertically reciprocable knife co-acting with said bed-plate during the movement of the bed-plate in the direction of feed of said strip, means for reciprocating said bed-plate in proper timed relation to complete the severing movement of the knife during the movement of the bed-plate in the said direction, a continuously rotating driving member, a trigger device located in the path of said strip to be cut, mechanism actuated by said trigger device for automatically coupling said driving member to said bed-plate-and-knife-actuating means, means for automatically throwing out said coupling means when the reciprocatory movement of said bed-plate and knife has been completed, and braking means for retarding the speed of movement of the parts as the point where said coupling mechanism is thrown out is approached.

In testimony, that I, claim the foregoing as my invention I affix my signature in the presence of two witnesses, this 25th day of January, A. D. 1913.

FRANK W. JOHNSON.

Witnesses:
M. K. ARMSTRONG,
CLARENCE E. MEHLHOPE.